United States Patent Office 3,489,715
Patented Jan. 13, 1970

3,489,715
PROCESS FOR REDUCING THE INFLAMMABILITY OF HIGH ORGANIC POLYMERS
Egon Bierwirth, Cologne, Kalk, and Hans-Joachim Kotzsch, Rheinfelden, Germany, assignors to Dynamit Nobel Aktiengesellschaft, a corporation of Germany
No Drawing. Filed Dec. 5, 1967, Ser. No. 687,986
Claims priority, application Germany, Dec. 8, 1966,
D 51,732
Int. Cl. C08f 45/56, 45/58
U.S. Cl. 260—41      7 Claims

ABSTRACT OF THE DISCLOSURE

A compound of the formula:

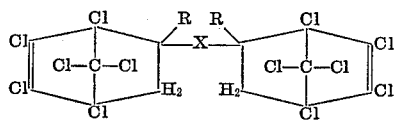

wherein X is a bivalent radical —CH$_2$·O·CH$_2$— or —CH$_2$·S·CH$_2$—, and R is methyl used as a flame retardant with polymers.

---

The combustibility of most high organic polymers is an obstacle to their use in a number of applications. Areas in which fire safety must be assured are, for example, the building industry, the mining industry, and the electrical industry. Therefore, many attempts have been made to render ordinarily combustible plastics fireproof.

For example, chlorinated hydrocarbons together with salts of metals of the fifth group of the periodic system have been used as fire-retardant additives. Such mixtures, however, have a tendency towards thermal decomposition reactions at the high manufacturing temperatures usually used, and this has an adverse effect on the mechanical qualities of the finished products. This disadvantage cannot be remedied even by the use of esters made from halogenated phenols with organic acids, since at the fairly high temperatures needed for the forming or hardening of a number of plastics, these compounds form hydrogen chloride or hydrogen bromide which are harmful to the mechanical and optical properties of the plastic, depending on the time for which the high temperature must be maintained.

Other fireproofing agents, such as aromatic or aromatic-aliphatic ethers which are chlorinated or brominated on the aromatic nucleus, or anilines brominated on the aromatic nucleus, which, in combination with antimonium trioxide, are used especially with polyolefins, tend to sweat out in storage forming efflorescences on the self-extinguishing molding compounds manufactured therewith.

To reduce the flammability of homopolymers and copolymers of styrene, butadiene or acrylonitrile, it has also been proposed to use m- and p-bis-(1,4,5,6,7,7-hexachlorobicyclo-(2,2,1)-5-heptene-2-yl)-benzene. These products do not cause any trouble due to decomposition reactions at the high temperatures in the manufacturing process. However, they are not very compatible with the polymers.

Additives made with antimony compounds, especially antimony trioxide, play an important part in the preparation of mixtures having a low flammability. However, these antimony compounds are not effective by themselves, but only in combination with substances containing halogen. The flame-retardant action of antimony trioxide is based on its reaction with the hydrohalic acid liberated in the thermal decomposition of the halogen-containing product with various reactions taking place which result in the retardation of the flame.

It is therefore an object of this invention to provide a novel flame retardant agent.

Another object is to provide a novel flame retardant-polymer composition.

Other and additional objects of this invention will become apparent from considering this entire specification including the claims hereof.

In accord with and fulfilling these objects, one aspect of this invention resides in the use, as a fire retardant in connection with polymers, of a compound of the formula:

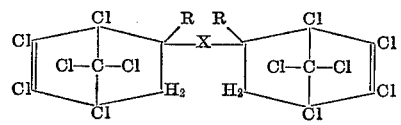

wherein R represents hydrogen or an alkyl group, especially a lower alkyl group having up to about 6 carbon atoms, preferably a methyl group, and X represents sulfur, oxygen or one of the following bifunctional radicals:
—SO—, —SO$_2$—, —CH$_2$·O·CH$_2$—, —CH$_2$·S·CH$_2$—,
—CH$_2$·SO·CH$_2$—, —CH$_2$·SO$_2$·CH$_2$—, —CO·O·CH$_2$—.
These materials are suitably used in proportion of about 1 to 40 weight percent, preferably about 10 to 30%, expressed as a percentage of the high polymer.

These substances of the above chemical formula are suitable for reducing the inflammability of most highly polymerized materials. Their use is especially effective in materials which have been produced by the polymerization of unsaturated compounds, especially of olefins, such as polyethylene, polypropylene, polystyrene, and copolymers thereof, also in combination with acrylonitrile and diolefines, and cross-linkable butadiene-styrene polymers. Also, natural and synthetic rubber compounds can be rendered effectively flame-proof in this manner. Polymers based on diolefins (homopolymers and copolymers) including the stereospecific types can also be mentioned in this connection.

The molding compounds rendered flame-proof according to the invention can contain conventional additives customarily used in polymer chemistry, such as plasticizers, lubricants, fillers, heat and light stabilizers, etc. If desired, the fire-retardant agents to be used according to the invention can be combined with other fire-retardant agents, such as chloroparaffins.

The high chlorine-content substances used according to the invention are easy to make in a prior-art manner, which is not herein claimed, by a Diels-Alder synthesis from hexachlorocyclopentadiene and divinyl ether, diallylether or diallylthioether, diallylsulfone, allylacrylate or allylmethacrylate, etc. Considering simplicity of manufacture to be a desirable feature particularly advantageous flame-retardant additives in the meaning of the invention are those in which X, in the above-given formula, signifies oxygen or one of the following bifunctional radicals: —CH$_2$·O·CH$_2$—, —CH$_2$·SO$_2$·CH$_2$—, —CH·O·CH$_2$—. The starting substances for these flame-retardant additives contain two double bonds and so they are very appropriate chemicals for the Diels-Alder reaction, and they are produced in considerable quantities as waste products in chemicals plants.

The additives used according to the invention have, in comparison with chlorinated hydrocarbons, organic acid esters of halogenphenols and other such substances, the advantage of improved temperature stability against the yielding of HCl. Therefore no trouble can be expected in this regard when the substances of the invention are used, even when the manufacturing is done at relatively high temperatures.

On account of this special behavior of the fire-retardant agents according to the invention as regards temperature variations, additional thermal stabilization is generally unnecessary. High polymers in whose manufacture very high temperatures are necessary can, if desired, have the usual heat stabilizers and antioxidants added to them. The customary stabilizers and high-polymer additives, such as agents to protect them against light, and lubricants and the like, can be used additionally.

On the other hand, these additives differ advantageously from the previously mentioned m- and p-bis(1,4,5,6,7,7 - hexachlorobicyclo - (2,2,1) - 5 - heptene-2-yl)-benzene as regards temperature stability. While the latter compounds are very stable substances under temperature stresses, the substances used according to the invention decompose at lower temperatures. On the one hand they are thermally stable enough to prevent trouble in the manufacturing process due to the splitting off of HCl, but on the other hand they are thermally unstable enough to decompose precisely in the temperature range that occurs in the combustion of the high polymer, and release the chlorine that acts to extinguish the flame.

As an additional advantage of the fire-retardant additives to be used according to the invention, it is to be stressed that the amount needed to achieve a certain fire-retardant effect is smaller than it is in the case of the last-named flame-proofing agent of the prior art.

In contrast to the last-named additives of the prior art, the additives according to the invention offer the additional advantage of good compatibility with high polymers, especially with the olefin polymers in the broader sense.

The incorporation of the flame-retardant additives, together, if desired, with other additives, can be performed by prior-art methods, as for example in a kneader, on a roller mill, and by mixing and granulating them on extruders.

To test the mixtures for flame resistance, they were plasticized on the roller mill and pressed into sheets 2 mm. thick. From these sheets were cut strips measuring 100 x 10 x 2 mm., which were subjected to a burning test. For this purpose the strips were fastened to a stand and a non-luminous gas flame 4 cm. high was played against the bottom end in such a manner that the bottom end of the specimen extended 1.5 cm. into the cone of the flame. After the flame was removed the afterburning of the specimen was timed to the point of extinction. The flame resistance was also confirmed by testing according to VDE standards (VDE Standard 0472).

The following examples are illustrative of this invention without being limiting thereon.

EXAMPLE 1

70 parts of polypropylene, 25 parts of the flame-retardant ether of the above-stated chemical formula wherein R represents methyl and X represents the bi-functional radical —$CH_2 \cdot O \cdot CH_2$—, and five parts of antimony trioxide were plasticized on a roller mixed at 170–180° C., and the sheet thus obtained was pressed to form a sheet 2 mm. thick. From this plate 10 strips measuring 200 x 10 x 2 mm. were cut and subjected to the above-described combustion test. Out of 10 specimens 4 extinguished themselves within one second, 2 within 3 seconds and 4 within 5 to 7 seconds. According to VDE Standard 0472, the afterburning time for 2 specimens was less than 1 second and was 4 seconds for one specimen.

The flame-retardant ether used in Example 1 was made in a prior-art manner as follows: 546 g. of hexachlorocyclopentadiene and 98 g. of diallyl ether were heated for 12 hours with stirring at 150 to 160° C. The crude product was dissolved in 500 ml. of acetone. Then a mixture of acetone and water in a 1:1 ratio by volume was added until the solution became slightly turbid. After 16 hours the crystallized product was removed by filtration. The yield amounted to 92% of the theory. A melting point of 172° C. was determined.

EXAMPLE 2

72.5 parts of high-pressure polyethylene, 20 parts of the flame-retardant ether of the above-stated chemical formula wherein R is methyl and X represents the bifunctional radical —$CH_2 \cdot O \cdot CH_2$—, and 7.5 parts of antimony trioxide were treated as in Example 1 at 130° C. Out of 10 test strips, 5 extinguished themselves within 2 seconds and 5 after 5 to 7 seconds. According to the VDE standard, the afterburning times were 2 seconds, 3 seconds, and less than 1 second.

EXAMPLE 3

72.5 parts of low-pressure polyethylene, 20 parts of the flame-retardant ether of the above-stated chemical formula wherein R is methyl and X represents the bifunctional radical —$CH_2 \cdot O \cdot CH_2$—, and 7.5 parts of antimony trioxide were treated as in Example 1 at 160° C. Out of 10 test strips, 4 extinguished themselves in 2 seconds, 4 in 5 seconds and 2 in 7 seconds.

EXAMPLE 4

67.5 parts of polypropylene, 25 parts of the flame-retardant ether of the above-stated chemical formula wherein R is methyl and X represents the bifunctional radical —$CH_2 \cdot S \cdot CH_2$—, and 7.5 parts of antimony trioxide were treated as in Example 1. Out of 10 test strips, 2 extinguished themselves within 2 seconds and 8 within 4 to 6 seconds.

EXAMPLE 5

72.5 parts of styrene-butadiene copolymer composed of 75% styrene and 25% butadiene, 15 parts of the flame-retardant ether of the above-stated chemical formula wherein R is methyl and X represents the bifunctional radical —$CH_2 \cdot O \cdot CH_2$—, and 7.5 parts of antimony trioxide were treated as in Example 1 at 160° C. Out of 10 test strips, 7 extinguished themselves immediately and 3 within 2 seconds.

What is claimed is:

1. A composition comprising at least one organic polymer about 1 to 20% by weight of an antimony compound and about 1 to 40 weight percent, based on said polymer, of at least one compound of the general formula:

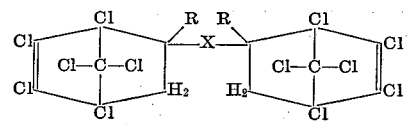

wherein R is methyl and X represents a member selected from the group consisting of —$CH_2 \cdot O \cdot CH_2$— and —$CH_2 \cdot S \cdot CH_2$—

2. Composition of claim 1, additionally including known halogen-containing fire-retardant agents.

3. Composition claimed in claim 1, containing about 10 to 30 weight percent of said compound.

4. Composition claimed in claim 1, containing antimony trioxide.

5. Composition claimed in claim 1, containing about 3 to 13 weight percent antimony compound.

6. Composition claimed in claim 1, wherein said polymer is an olefin polymer.

7. Composition claimed in claim 6, wherein said polymer is made from at least one monomer selected from the group consisting of ethylene, propylene, butene-1, styrene, acrylonitrile and butadiene.

(References on following page)

References Cited

UNITED STATES PATENTS

| | | |
|---|---|---|
| 3,085,885 | 4/1963 | Caldwell. |
| 3,142,695 | 7/1964 | Rolih et al. |
| 3,158,588 | 11/1964 | Johnson. |
| 3,347,807 | 10/1967 | Blair. |
| 3,385,819 | 5/1968 | Gouinlock. |

MORRIS LIEBMAN, Primary Examiner

SAMUEL L. FOX, Assistant Examiner

U.S. Cl. X.R.

106—15; 252—8.1; 260—41.5, 609